(12) United States Patent
Adams

(10) Patent No.: US 11,414,347 B2
(45) Date of Patent: *Aug. 16, 2022

(54) CONCRETE PRODUCT AND METHODS OF PREPARING THE SAME

(71) Applicant: S3 Concrete Technologies, Inc., Marietta, GA (US)

(72) Inventor: Jason S. Adams, Marietta, GA (US)

(73) Assignee: S3 Concrete Technologies, Inc., Marietta, GA (US)

( * ) Notice: Subject to any disclaimer, the term of this patent is extended or adjusted under 35 U.S.C. 154(b) by 40 days.

This patent is subject to a terminal disclaimer.

(21) Appl. No.: 17/002,757

(22) Filed: Aug. 25, 2020

(65) Prior Publication Data

US 2021/0061707 A1    Mar. 4, 2021

Related U.S. Application Data

(60) Provisional application No. 62/892,533, filed on Aug. 27, 2019.

(51) Int. Cl.
*C04B 14/02* (2006.01)
*C04B 28/02* (2006.01)
(Continued)

(52) U.S. Cl.
CPC ............. *C04B 14/026* (2013.01); *B28B 1/14* (2013.01); *B28B 1/523* (2013.01); *B28B 1/525* (2013.01);
(Continued)

(58) Field of Classification Search
CPC ....... C04B 14/026; C04B 14/48; C04B 28/02; C04B 40/0046; B28B 1/14; B28B 1/523; B28B 1/525; B28B 11/048
(Continued)

(56) References Cited

U.S. PATENT DOCUMENTS 5,569,343 A   10/1996 Garrigus
5,622,558 A    4/1997 Berke et al.
(Continued)

FOREIGN PATENT DOCUMENTS

EP   3094460 A1   11/2016
EP   2771395 B1    9/2017
(Continued)

OTHER PUBLICATIONS

Du et. al., "Laboratory investigation of graphene oxide suspension as a surface sealer for cementitious mortars", Construction and Building Materials, 162, 65-79 (2018) (Year: 2018).*
(Continued)

*Primary Examiner* — Karl E Group
*Assistant Examiner* — Cameron K Miller
(74) *Attorney, Agent, or Firm* — Jansson Munger McKinley & Kirby Ltd.

(57) ABSTRACT

A concrete product set by pouring a concrete slurry includes a) a concrete mixture; b) a graphene oxide admixture; and c) at least one reinforcing fiber selected from the group of fibers. As the poured concrete slurry cures, the poured slurry hardens into a composite material product, and the composite material is embedded with graphene oxide. In another exemplary embodiment, the present invention is directed to a process for preparing a concrete product. The process comprises the steps of a) preparing a concrete slurry with integral graphene oxide; b) pouring the concrete slurry; c) allowing the concrete slurry to cure; and d) optionally spray-applying graphene oxide and/or optional colloidal silica as a curing technique. In another exemplary embodiment, the present invention is directed to the product itself; namely, a concrete product with fibers and embedded graphene oxide flakes.

20 Claims, 12 Drawing Sheets

FIG. 2

(51) Int. Cl.
*C04B 14/48* (2006.01)
*C04B 40/00* (2006.01)
*B28B 1/14* (2006.01)
*B28B 11/04* (2006.01)
*B28B 1/52* (2006.01)

(52) U.S. Cl.
CPC ............ *B28B 11/048* (2013.01); *C04B 14/48* (2013.01); *C04B 28/02* (2013.01); *C04B 40/0046* (2013.01)

(58) Field of Classification Search
USPC ......................................................... 106/644
See application file for complete search history.

(56) References Cited

U.S. PATENT DOCUMENTS

| | | |
|---|---|---|
| 7,571,581 B2 | 8/2009 | Covarrubias |
| 8,211,227 B2 | 7/2012 | Chung et al. |
| 8,784,558 B2 | 7/2014 | Berke et al. |
| 8,951,343 B2* | 2/2015 | Sadiq ...................... B82Y 30/00 106/644 |
| 9,284,225 B2 | 3/2016 | Oslejs et al. |
| 9,758,379 B2 | 9/2017 | Blair |
| 10,351,473 B2 | 7/2019 | Christiansen |
| 2011/0003904 A1 | 1/2011 | Guevara et al. |
| 2012/0021206 A1 | 1/2012 | Oslejs et al. |
| 2013/0053474 A1 | 2/2013 | Rice et al. |
| 2013/0344390 A1 | 12/2013 | Chen et al. |
| 2014/0060388 A1 | 3/2014 | Sadiq et al. |
| 2015/0299041 A1 | 10/2015 | Wetherell et al. |
| 2016/0115293 A1 | 4/2016 | Aksay et al. |
| 2017/0037257 A1* | 2/2017 | Yang ........................ C09D 5/24 |
| 2017/0106342 A1 | 4/2017 | Raveendran-Nair et al. |
| 2019/0367420 A1 | 12/2019 | Hartman et al. |
| 2020/0062659 A1 | 2/2020 | Hartman et al. |
| 2020/0087202 A1 | 3/2020 | Adams |

FOREIGN PATENT DOCUMENTS

| | | |
|---|---|---|
| WO | 2013096990 A1 | 7/2013 |
| WO | 2015108990 A1 | 7/2015 |
| WO | 2016040612 A1 | 3/2016 |

OTHER PUBLICATIONS

Aberdeen Group "Liquid Membrane Curing Compounds" (1966) (Year: 1966).*
Reade International Corp. "Graphene Oxide (GO) Dispersion, Flake & Powder" retrieved from the Wayback Machine web archive (2016) (Year: 2016).*
Amirkhanian et al. "Overview of fiber-reinforced concrete bridge decks", Iowa State University—Institute of Transportation (Mar. 2019) (Year: 2019).*
Hilal "Microstructure of Concrete, Higher Performance Concrete Technology and Applications", IntechOpen (2016) (Year: 2016).*
Zhao et. al. "Synergistic effects of silica nanoparticles/polycarboxylate superplasticizer modified graphene oxide on mechanical behavior and hydration process of cement composites", RSC advances, 7(27), 16688-16702 (2017) (Year: 2017).*
International Search Report and Written Opinion—PCT/US2020/046221—dated Nov. 18, 2020.
International Search Report and Written Opinion—PCT/US2020/048051—dated Dec. 3, 2020.

* cited by examiner

CONCRETE PRODUCT AND METHODS OF PREPARING THE SAME

RELATED APPLICATION

This application claims priority under 35 U.S.C. 119(e) to provisional patent application Ser. No. 62/892,533, filed on Aug. 27, 2019, entitled "CONCRETE PRODUCT AND METHODS OF PREPARING THE SAME." The entire contents of this provisional patent application are hereby incorporated herein by reference.

FIELD

The present disclosure generally relates to concrete construction processes and to the formation of concrete products. More particularly, the present disclosure is generally directed to a system for and method of preparing and pouring a concrete slurry for the formation of concrete products.

BACKGROUND

Concrete products, such as concrete slabs (floor slabs, foundation slabs), concrete rafts, concrete pillars and columns, etc., are usually composed of unreinforced or reinforced concrete. The level of reinforcement generally is dictated by at least the intended use, the exposure to the elements, the load, and the loading intensities, amongst various other factors. Reinforcement also is used to control cracking or fracturing, which is common throughout the useful life of a concrete product.

Various attempts have been made in the field to minimize the need for reinforcement. Unsuccessful solutions have been conceived to vary the composition of the concrete mixture, and/or to vary the methods of preparing the concrete mixture into a concrete slurry, and/or to vary the ballast material used in forming the final concrete product. These possible solutions; however, usually require a concrete formulation comprising expansive admixtures with the hope of countering the shrinkage of the concrete and the loss of water. In these solutions it is difficult to determine the proper amount of expansive admixtures required to counter the shrinkage.

The use of such unsuccessful solutions usually gives rise to unpredictable results; in particular, results requiring concrete-producing entities to employ one or more solutions to mitigate the risk of concrete slab failure. This adds unnecessary complexity and unforeseen consequences, as is described in greater detail herein. It is, therefore, desirable to overcome the deficiencies of and provide for improvements in the state of the prior art.

Improved methods, process, and systems in the formation of concrete products are discussed. As used herein, any reference to an object of the present invention should be understood to refer to solutions and advantages of the present invention, which flow from its conception and reduction to practice, and not to any a priori or prior art conception. A better understanding of the principles and details of the present invention will be evident from the following description.

SUMMARY

Exemplary embodiments are directed to a system for, and a method of, forming concrete products like concrete slabs and rafts and molded concrete products, based on a uniquely prepared concrete mixture and/or a unique curing technique. Exemplary embodiments also are generally directed to a process for the formation of concrete products that is more efficient and effective, and that reduces the carbon footprint, energy consumption, and environmental costs of preparing, placing, and producing concrete products.

In one exemplary embodiment, a concrete product may be set by pouring a concrete slurry. In an exemplary embodiment, the poured concrete slurry comprises a) a concrete mixture; b) a graphene oxide admixture; and c) at least one fiber selected from a group of fibers consisting of steel fibers, helix fibers, basalt fibers, polyvinyl alcohol (PVA) fibers, carbon fibers, and synthetic fibers. As the poured concrete slurry cures, the poured concrete slurry hardens into a composite material taking the form of a concrete product. The hardened aggregate and cement of the concrete product is a composite material embedded with dispersed graphene oxide that provide stiffness and strength to, and prevent over-drying, shrinkage, and cracking of, the concrete product.

In another exemplary embodiment, the graphene oxide admixture comprises dispersed nanometer-sized graphene oxide monolayers in a liquid phase carrier wherein the monolayers are buckled, and the layers are about $1.10\pm0.20$ nm thick with a lattice constant of about 0.27 nm×0.41 nm. The concrete mixture comprises aggregate, cement, and water, wherein the concrete mixture is defined by a water to cement ratio of between about 0.400 to about 0.450. If present, the at least one fiber selected from a group of fibers represents between about 0.25 percent (%) by volume to about 0.50% by volume of the poured concrete slurry, or more specifically between about 0.20% by volume to about 0.50% by volume of the poured concrete slurry.

In another exemplary embodiment, the concrete product is set by pouring a concrete slurry and then applying a curing technique to the poured and set concrete slurry. In an exemplary embodiment, the curing technique may comprise spray-applying a secondary application of the dispersed graphene oxide monolayers and/or a first application of colloidal silica (in an exemplary embodiment where no colloidal silica is integral to the concrete slurry prior to the spray-applying step) onto the poured and set concrete slurry. The graphene oxide monolayers are about $1.10\pm0.20$ nm thick with lattice constant of about 0.27 nm×0.41 nm. The mixture used for the spray application is defined as having between about 10.0 grams to 1,000.0 grams of graphene oxide per gallon of liquid carrier. The spray-applied mixture can be applied using pump sprayers, walk-behind electric-powered "turf" sprayers, and the like, and includes all manner of spraying a liquid solution onto a surface.

In another exemplary embodiment, the present invention is directed to a process for preparing a concrete product. In an exemplary embodiment, the process comprises the steps of a) preparing a concrete slurry comprising i) a concrete mixture; ii) a graphene oxide admixture; and iii) at least one fiber selected from a group of fibers consisting of steel fibers, helix fibers, basalt fibers, PVA fibers, carbon fibers, and synthetic fibers, b) pouring the concrete slurry; and c) allowing the concrete slurry to cure such that the cement and aggregate structure of the concrete product have the nanometer-sized monolayers of the graphene oxide embedded therein, and/or overlapping layers of graphene oxide embedded therein.

In an exemplary embodiment, the preparing step comprises preparing the concrete slurry with a graphene oxide admixture, wherein the graphene oxide admixture is formed from sheared and dispersed monolayers of graphite oxide powder, and adding the graphene oxide admixture to the concrete slurry in ranges of between about 0.01% to about 0.10% by weight of cement. The preparing step additionally comprises preparing the concrete slurry for pouring with dosages of steel fibers as the at least one fiber selected from a group of fibers of between about 33.0 pounds per cubic yard (lbs./cuyd) to about 66.0 lbs./cuyd. The preparing step additionally comprises preparing the concrete slurry for pouring with dosages of macro synthetic fibers as the at least one fiber selected from a group of fibers of between about 3.0 lbs./cuyd to about 7.5 lbs./cuyd. The preparing step additional comprises preparing the concrete slurry for pouring with dosages of helix fibers as the at least one fiber selected from a group of fibers of between about 3.0 lbs./cuyd to about 35.0 lbs./cuyd.

In another exemplary embodiment, the process additionally comprises the step of spray-applying a secondary graphene oxide application, a first application of colloidal silica (in an exemplary embodiment where no colloidal silica is integral to the concrete slurry prior to the spray-applying step), a secondary colloidal silica application, and/or the secondary graphene oxide and colloidal silica composite onto the poured concrete slurry onto the poured concrete slurry to facilitate curing thereof. The mixture used for the spray-applying step is defined as having between about 10.0 grams to 1,000.0 grams of graphene oxide per gallon of liquid carrier. In an exemplary embodiment, the spray-applying step comprises spray applying the graphene oxide application onto the poured concrete slurry subsequent to removal of a trowel machine, and prior to cement in the poured concrete slurry being completely set, or subsequent to cement in the poured concrete slurry being completely set.

In another exemplary embodiment, a concrete product is provided. The concrete product is set from a concrete slurry, the poured concrete slurry comprising a concrete mixture, a graphene oxide admixture, and at least one fiber selected from a group of fibers consisting of steel fibers, helix fibers, basalt fibers, PVA fibers, carbon fibers, and synthetic fibers, the concrete product comprising hardened aggregate and cement embedded with sheared monolayers of graphite oxide powder, whereby the dispersed graphene oxide particulates provide stiffness and strength, and prevent overdrying, shrinkage, and cracking of the concrete product.

DETAILED DESCRIPTION

Figure 1:
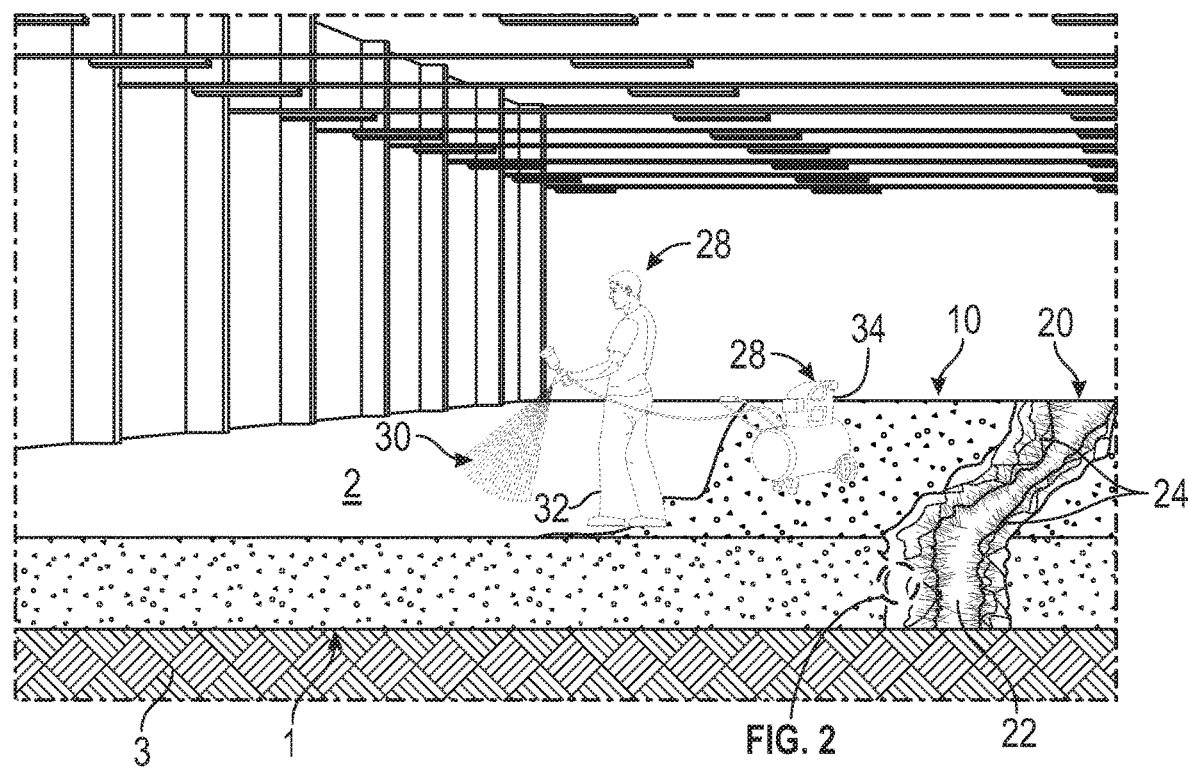
FIG. 1 is a perspective view of an exemplary concrete slab.

For a further understanding of the nature, function, and objects of the present invention, reference should now be made to the following detailed description. While detailed descriptions of the preferred embodiments are provided herein, as well as the best mode of carrying out and employing the present invention, it is to be understood that the present invention may be embodied in various forms. Specific details disclosed herein are not to be interpreted as limiting but rather as a basis for the claims and as a representative basis for teaching one skilled in the art to employ the present invention in virtually any appropriately detailed system, structure, or manner.

For purposes of this disclosure, percent (%) by weight refers to the aggregate weight of the particles in comparison to the final weight of cement in a final concrete product.

Embodiments and aspects of the present disclosure provide a system for, and method of, preparing and pouring a concrete slurry for the formation of concrete products, which are not susceptible to the limitations and deficiencies of the prior art. The inventive concepts described herein allow for the formation, in certain non-limiting embodiments, of concrete slabs and rafts, based on the addition of a chemical admixture when preparing the concrete slurry. In other non-limiting embodiments, the inventive concepts described herein allow for the formation of concrete slabs and rafts based on the application of a chemical treatment to a poured concrete slurry, which in some instances facilitates curing of the poured concrete. In other non-limiting embodiments, the inventive concepts described herein allow for the formation of a concrete product based on the synergistic combination of a specifically prepared concrete slurry with a curing technique.

The inventive concepts described herein also allow for a decreased need for and a decreased use of traditional reinforcements such as rebar and/or mattings. This allows for efficiencies in time, labor, and resources, and allows for a streamlining and simplifying of the process for forming and maintaining a concrete product.

A first exemplary embodiment provides a system for, and method of, preparing and pouring a concrete slurry for the formation of concrete products, wherein micro- and/or nano-particles, particulates, carbon-chains and/or fibers are paired with a durable and flexible blend of aggregates, pastes, and admixtures, to provide a mass of substantially impermeable concrete exhibiting exceptional tensile strength and durability for the heaviest loads and equipment.

A second exemplary embodiment provides a system for, and method of, forming a concrete product via a concrete slurry and/or curing technique, wherein the concrete slurry leverages graphene oxide in optional combination with fibers (steel ASTM 820 fibers, helix fibers, basalt fibers, polyvinyl alcohol fibers, carbon fibers, and/or other macro synthetic ASTM C1116 fibers, for example, wherein ASTM is defined as American Society for Testing and Materials and its consensus standards, grades, and certifications, as of 6 Aug. 2020) to create an improved concrete mass. The graphene oxide is used as an admixture for the concrete slurry and/or sprayed onto the surface of the poured concrete slurry as a "cure" soon after or right after the trowel machine is removed.

The graphene oxide works to fill a capillary structure in the concrete to reduce internal tensile forces and/or to provide stiffness and strength, which drastically reduces the likelihood of shrinking and cracking of the concrete. Spraying the surface of the poured concrete slurry with the graphene oxide at the appropriate time and dosage as described herein has been found by the inventor to be similar to a 28-day wet cure. In an exemplary embodiment, open capillaries, or open capillary structures, are filled with nanometer-sized graphene oxide monolayers, which reduce or substantially eliminate moisture loss by plugging the pores of the open capillary structures. Further, the concrete structure defining the capillaries is embedded with nanometer-sized graphene oxide monolayers, which are defined by stiffness and strength due to the presence of a two-dimensional graphene backbone. It is possible that the graphene oxide monolayers may overlap to create an interwoven layer structure that distributes load. These liquid-dispersed monomolecular sheets are defined herein as graphene oxide sheets or flakes. The inventor has also found that this process is not temporary, and is instead a permanent solution.

At this high-level non-limiting example, the use of the dispersed graphene oxide flakes as an admixture and/or spray works to prevent shrink cracking and moisture loss and provides a reinforcement effect to the concrete product. The dispersed graphene oxide flakes may be derived from graphite oxide, also known as graphitic oxide or graphitic acid, which may be obtained by treating graphite with strong oxidizers. Graphite oxide demonstrates considerable variations of properties depending on the degree of oxidation and synthesis method used. Regardless of how it is derived, the bulk graphite oxide material spontaneously disperses in basic solutions or can be dispersed by sonication, for example, in polar solvents to yield the monomolecular sheets of graphene oxide. Graphite oxide and the derived graphene oxide flakes generally are hydrophilic and easily hydrated when exposed to water in liquid or gas phase, resulting in a distinct increase of the inter-planar distance (up to about 1.2 nm in its saturated state). Additional water may be incorporated into the interlayer space between monolayers of graphene oxide due to high-pressure induced effects. The hydration state of graphene oxide in liquid water corresponds to insertion of about 2-3 water monolayers, for example. Complete removal of water from graphene oxide is known to be difficult as direct heating at 60-80° C. commonly results in partial decomposition and degradation of the chemical structure.

A third exemplary embodiment provides a process for placing a concrete slab on a substrate for industrial and commercial applications. The slab is characterized by having superior abrasion-resistance and higher than normal resistance to the effects of aggressive water and chemical attack, such as salt, when compared to traditional concrete composite materials. The slab also provides a highly dense, highly accurate, and planar concrete surface with limited internal macro-reinforcements and a thinner cross section than a conventional concrete slab of the same strength.

For this particular embodiment, the process comprises: (1) preparing a concrete slurry with a water to cement ratio of between about 0.400 to about 0.450, with steel fibers or macro synthetic fibers (helix, basalt, PVA, carbon or other macro synthetic fibers, for example), or a combination of these fibers, (2) preparing the concrete slurry with graphene oxide flakes, integral thereto, (3) performing a "spray-apply" step using graphene oxide, and (4) providing reaction and performance enhancing chemicals to the slurry or to the curing/to-be finished product. The overall process comprises establishing a highly accurate, and well compacted subbase preparation as a foundation in preparation for placement of the concrete.

A fourth exemplary embodiment provides a method comprising the step of using steel fibers to mitigate shrinkage cracks in the concrete. Fibers help mitigate plastic and drying shrinkage by arresting the movement of the concrete slab and distributing any shrinkage across the entire slab and fiber network area by means of micro cracking, i.e., when shrinkage occurs the fibers engage and redistribute the shrinkage. This holds true for both steel and macro-synthetic fibers, as described in greater detail herein.

This step may be one step in a series of steps making up an exemplary embodiment. As is described in greater detail herein, shrinkage cracks occur either as early plastic shrinkage, nucleating in the first 24 hours while the concrete has low strength, or nucleating as late cracks, due to the external restraint of the volume change during the drying shrinkage. As water is lost in the cement paste, shrinking places the aggregates in compression. Fine and discrete cracks nucleate and extend from the perimeter of the aggregates, and the numerous fine cracks continue to extend, while shrinkage increases over time and the cracks coalesce. As the concrete slab shrinks, the concrete slab shortens in all directions. The microcracks then combine at the location of the greatest strain and stress, where subsequently a crack will form.

For this particular embodiment, the step of using steel fibers to mitigate shrinkage cracks in the concrete allows for fibers to be randomly distributed throughout the concrete slab and can, with close spacing and good bonding, intercept the formation of cracks. Different types of steel fibers may be used for different applications. Some Type 2 steel fibers are sized to number about 9000.0 fibers per pound (lb.) and are used typically in dosages of about 33.0 lbs./cuyd (representing about 0.250% by volume of concrete) to about 66.0 lbs./cuyd (representing about 0.50% by volume of concrete). Some Type 1 steel fibers are sized and number about 2500.0 fibers per pound and may also be used.

A fifth exemplary embodiment provides a method comprising the step of using macro synthetic fibers to mitigate shrinkage cracks in concrete. This step may be one step in a series of steps making up an exemplary method of the present invention. The effect of the macro synthetic fibers is similar to the step of using steel fibers to mitigate shrinkage cracks in the concrete. However, the step of using macro synthetic fibers to mitigate shrinkage cracks in concrete also improves water retention and; therefore, assures a more complete hydration of the cement, and may also reduce plastic shrinkage more effectively than steel fibers in some circumstances. Further, the high fiber count associated with the step of using macro synthetic fibers intercepts the formation of microcracks and, therefore, reduces the formation of larger cracks. The macro synthetic fibers also may be added to the concrete in dosage rates of about 3.0 lbs./cuyd representing about 0.20% by volume of concrete to about 7.50 lbs./cuyd, representing about 0.50% by volume of concrete, or about 3.0 lbs./cuyd to about 35.0 lbs./cuyd if helix fibers.

A sixth exemplary embodiment provides a method comprising the step of using or adding graphene oxide flakes to the slurry. This step may be one step in a series of steps making up an exemplary method of the present invention.

With regard to the graphene oxide flakes, an oxidation product of the compound carbon, oxygen, and hydrogen in variable C:O ratios of between 2.1 and 2.9 is in aqueous solution. In its dry form, it essentially presents as a black powder or soot. The bulk oxidation-product is dispersed in solution and defined as having monomolecular sheets similar to the single-layer spatial arrangement of atoms for graphite but with a larger and more irregular spacing.

The graphene oxide flakes, in comparison to graphite, have monomolecular sheets that are buckled, and the interlayer spacing is about two times larger (~0.7 nm) than that of graphite. The graphene oxide layers are about 1.10±0.20 nm thick and the graphene oxide layers are spontaneously dispersed in a basic solution or mechanically dispersed by sonication in a polar solvent, as needed. Scanning tunneling microscopy shows the presence of local regions where oxygen atoms are arranged in a rectangular pattern with lattice constant of about 0.27 nm×0.41 nm. Graphene oxide has unique surface properties, which make it a very good surfactant material stabilizing various colloidal systems.

For this particular embodiment, the dispersed graphene oxide flake admixture is added to the concrete during the preparation phase in ranges of between about 0.01% to about 0.10% by weight of cement, depending on the concrete slurry design and the application.

A seventh exemplary embodiment provides a method comprising the step of using a spray-applied graphene oxide as a curing technique. This step may be one step in a series of steps making up an exemplary method of the present invention. Graphene oxide flakes with particles sizes of about 0.5 nm in a liquid carrier are sprayed on a surface of the finished concrete slab after final set of the cement, or as described in greater detail herein.

The spray-applied graphene oxide can be applied using a pump sprayer, a walk-behind electric-powered "turf" sprayer, and the like, as well as custom-made automated spraying machines. The entire surface of the slab is sprayed such that the nanometer-sized particles penetrate and fill the capillary structures and become embedded into the surrounding concrete structure. This process step of spray-applying graphene oxide may occur after the concrete has been trowel finished and can be walked on without imprinting the surface.

An eighth exemplary embodiment provides a system for, and a method of, preparing and pouring a concrete slurry with graphene oxide, as described herein, for the formation of concrete products, wherein a polycarboxylate ether-based superplasticizer admixture is paired with the cement mixture, graphene oxide admixture, and/or the secondary spray-applied graphene oxide, to provide an impermeable fiberless mass of concrete. With a relatively low dosage (0.15-0.30% by weight of cement, for example), a polycarboxylate ether-based superplasticizer allows water reduction due to its chemical structure, which enables good particle dispersion. Polycarboxylate ether-based superplasticizers are composed of a methoxy-polyethylene glycol copolymer (side-chain) grafted with methacrylic acid copolymer (main-chain). The carboxylate group —COO—Na+ dissociates in water, providing a negative charge along the polycarboxylate ether-based superplasticizer backbone. As a consequence of PCE adsorption, the zeta potential of the suspended particles changes, due to the adsorption of the COO— groups on the colloid surface. This displacement of the polymer on the particle surface provides the side chains the opportunity to exert repulsion forces, which disperse the particles of the suspension and helps avoid friction.

A ninth exemplary embodiment provides a system for, and method of, forming a concrete product via a concrete slurry and/or curing technique, wherein the concrete slurry comprises colloidal silica and graphene oxide in optional combination with steel and/or macro synthetic fibers to create a concrete product. The colloidal silica and graphene oxide composite is used as an admixture and/or sprayed onto the surface of the poured concrete slurry soon after or right after the trowel machine is removed.

The colloidal silica works to fill the capillary structures with reactive nanometer-sized silica particles that react with the free lime to produce a stable gel structure of calcium silicate hydrate, which reduces or substantially eliminates moisture loss by plugging the pores of the capillary structures. At this high-level non-limiting example, the use of colloidal silica as an admixture and/or spray works with the internal cement molecule. Colloidal silica, which is included within the category of pozzolans, is a suspension of fine amorphous, nonporous, and typically spherical silica particles in a liquid phase. During curing and thereafter, the colloidal silica will react with free lime, increasing the density and structural strength of the solid structures formed. The increased density and long-term pozzolanic action ties up free lime, which limits the creation of channels and decreases the permeability in the concrete structure. Moreover, the resultant chemical and structural effect also helps keep contaminants and particles on the surface of the concrete.

A tenth exemplary embodiment provides a process comprising: (1) preparing a concrete slurry with a water to cement ratio of between about 0.400 to about 0.450, with steel fibers or macro synthetic fibers, or a combination of these fibers, (2) preparing the concrete slurry with colloidal silica and graphene oxide flakes, integral thereto, (3) performing a "spray-apply" step using colloidal silica, and (4) providing reaction and performance enhancing chemicals to the slurry or to the curing/to-be finished product. The overall process comprises establishing a highly accurate, and well compacted subbase preparation as a foundation in preparation for placement of the concrete.

An eleventh exemplary embodiment provides a method comprising the step of using or adding colloidal silica and graphene oxide flakes to the slurry. This step may be one step in a series of steps making up an exemplary method of the present invention. Amorphous nanometer-sized silica ($SiO_2$) in a particle size ranging from between about 3.0 nm to about 100.0 nm, or from between about 5.0 nm to about 100.0 nm, is in aqueous solution and is added to the concrete slurry along with the graphene oxide admixture and the reaction enhancing and workability enhancing (rheology enhancing) admixtures, such as polycarboxylate. The silica will react with the free lime or calcium hydroxide ($Ca(OH)_2$) from the cement hydration to form a solid gel product called CSH, or calcium silicate hydrate ($CaSiO_3+H_2O$).

For this particular embodiment, as is shown in the following Formula 1:

$$Ca(OH)_2 + SiO_2 \rightleftharpoons CaSiO_3 + H_2O \quad (1)$$

the colloidal silica aqueous solution is added to the concrete during the preparation phase in ranges of between about 0.50% to about 10.0% by weight of cement, depending on the concrete slurry design and the application. The above described chemical reaction will consume some of the capillary water and will fill the pores with the hydration products CSH and, therefore, greatly reduce drying shrinkage.

A twelfth exemplary embodiment provides a method comprising the step of using a spray-applied colloidal silica and graphene oxide as a curing technique. This step may be one step in a series of steps making up an exemplary method of the present invention. Amorphous colloidal silica with sizes of between about 3.0 nm to about 50.0 nm in an aqueous solution and/or graphene oxide flakes with sizes of about 0.5 nm is/are sprayed on a surface of the finished concrete slab after final set of the cement, or as described in greater detail herein.

The nanometer-sized silica penetrates up to about 3.0" deep into the hardened concrete after between about 3.0 to about 6.0 hours after the final set of cement and react with the capillary pore water and available calcium hydroxide to form CSH, calcium silicate hydrate, as described herein. This also will seal the top of the concrete and prevent water from evaporating from the concrete mixture and thus enhance the cement hydration process.

A thirteenth exemplary embodiment provides a method of preparing a graphene oxide and colloidal silica composite admixture comprising the step of adding graphite oxide powder to a colloidal silica admixture, and either mechanically shearing the composite with a high-shear mixing device, and/or mechanically shearing the composite via probe sonication with an ultrasonic cavitation device, such that the resulting graphene oxide flakes are dispersed into the colloidal silica admixture. The resulting composite admixture may then be mixed into a concrete mixture as described herein.

A fourteenth exemplary embodiment provides a method of preparing a graphene oxide and/or colloidal silica spray application and using it as specific chemical treatment for a poured concrete slurry, which may be prepared without graphene oxide or colloidal silica, whereby the spray application facilitates curing of the poured concrete. This method can be used for the formation of any concrete product like a concrete slab or raft, or any molded concrete product, etc.

FIG. 1 shows a perspective view of an exemplary concrete slab 1. The concrete slab 1 of FIG. 1 is shown placed in warehouse-type setting according to an exemplary embodiment. The concrete slab 1 is placed on top of a leveled and compacted substrate 3 and is for industrial and commercial applications in this exemplary embodiment.

The concrete slab 1 is illustrated in partial cut-away form to show layers of internal composition and structure of the composite material. The first cut-away section 10 illustrates the sub-surface, below the curing/to-be finished exterior 2. The sub-surface of the first cut-away section 10 is porous, unfinished and rough. The second cut-away section 20 illustrates the concrete slab 1 having a crack 22 to expose the internal composition of the composite material of the concrete slab 1. In particular, the concrete slab 1 comprises hardened aggregate and cement as well as one or more of steel fibers and macro synthetic fibers 24. However, in other exemplary embodiments, the concrete slab 1 may be made without such steel fibers and/or macro synthetic fibers. The hardened aggregate and cement, as well as steel fibers and macro synthetic fibers 24 if such fibers are included, at least in part define capillary structures 26 (best seen in FIG. 2) throughout the concrete slab 1. In an exemplary embodiment, the capillary structures 26 (FIG. 2) are filled with nanometer-sized graphene oxide monolayers. The concrete structure defining the capillary structures 26 also is embedded with nanometer-sized graphene oxide monolayers or overlapping graphene oxide layers. In another exemplary embodiment, if a colloidal silica admixture is used to prepare the concrete slurry, then capillary structures 26 (FIG. 2) also are filled with reactive nanometer-sized silica that react with free lime to produce a stable gel structure of calcium silicate hydrate within the capillary structures 26.

The concrete slab 1 is illustrated with an optional and exemplary spray-apply system 28. The system 28 may also be used for spray-applying a secondary graphene oxide 30 as described herein (see FIGS. 4 and 6). The system 28 comprises an optional human operator 32 using an exemplary embodiment of a spraying machine 34. The system 28 optionally is used after a concrete slurry of the present invention is poured, trowel finished, and can be walked on by the human operator 32, without imprinting the surface of the hardening concrete slab 1. The system 28 optionally sprays the entire surface of the concrete slab 1 to saturation such that the nanometer-sized graphene oxide flakes in the secondary spray 30 can penetrate the capillary structures 26 and the surrounding concrete structure defining the capillary structures 26. In another exemplary embodiment, if colloidal silica is used to prepare the secondary spray 30, then the nanometer-sized colloidal silica in the secondary silica spray 30 also can penetrate the capillary structures 26.

Figure 2:
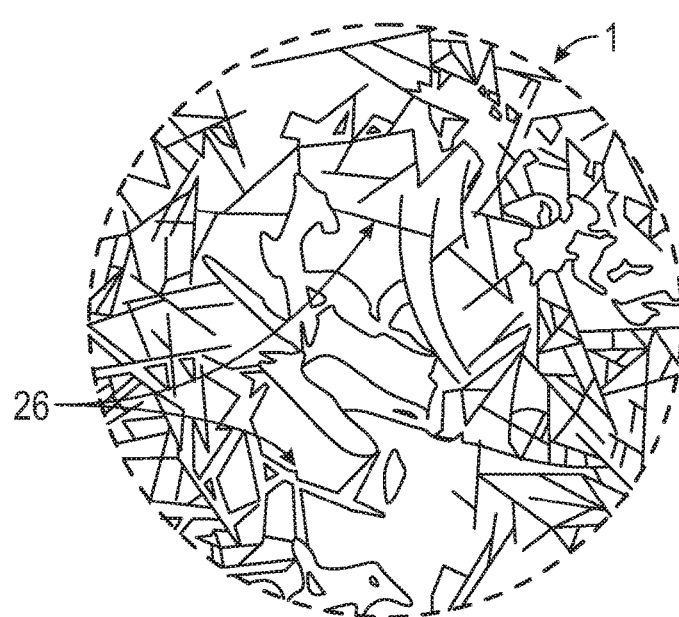
FIG. 2 is a magnified perspective view of a cut-away portion of the concrete slab of FIG. 1.

FIG. 2 is a magnified perspective view of the crack 22 along the second cut-away section 20 of the concrete slab 1 of FIG. 1. The magnified section of FIG. 1 illustrated in FIG. 2 shows a view of the intersection of the hardened aggregate and cement as well as steel fibers and macro synthetic fibers 24, if included, that at least in part define the capillary structures 26 of the concrete slab 1. In one exemplary embodiment, the concrete slab 1 may comprise and benefit from joint cutting, and the crack 22 may be situated along a line for a possible cut-joint or possible construction-joint, for example.

Joint cutting in an already-placed concrete slab, or joint making in a to-be-placed concrete slab, commonly is used to divide at least a portion of the width of the concrete slab into adjacent partitioned slabs, such that any shrinkage or contraction of the concrete is localized to the cut-line or joint and, thereby, will minimize such formations at other portions of the partitioned slab. Cut joints in the concrete slab 1 may come in various forms, such as saw-cutting the slab at 5.0 meters (m) to 15.0 m intervals at full or partial depth, or full-depth construction joints at similar intervals. Certain regulatory agencies have guidelines recommending joints at about 14.0 feet (') distances for a 6 inch (") thick slab, and at about 17.0' distances for an 8" thick slab. That said, the graphene oxide as an additive integral to the concrete slab 1 in combination with joint cutting or joint-making solution provides a synergistic benefit. The synergistic benefit means that joints safely and effectively can be placed at about 20.0 feet (') distances for a 6 inch (") thick slab, and at about 25.0' distances for an 8" thick slab, or at greater distances possible than without the inventive concepts described herein.

In other exemplary embodiments, the concrete slab 1 may comprise and benefit from the use of a shrinkage-compensating concrete mix comprising a Type K cement incorporating a calcium sulfoaluminate additive, for example, to avoid the need for or to mitigate the quantity of joints in the slab. This Type K cement, which is one example of the broader field of expansive cements, is used in combination with rebar or steel fibers to help restrain the cement of the concrete slab 1 as it expands. The expansive cement composite with integral silica and/graphene oxide may require at least a 7-day wet cure to ensure that the designed expansion occurs.

Figure 3:
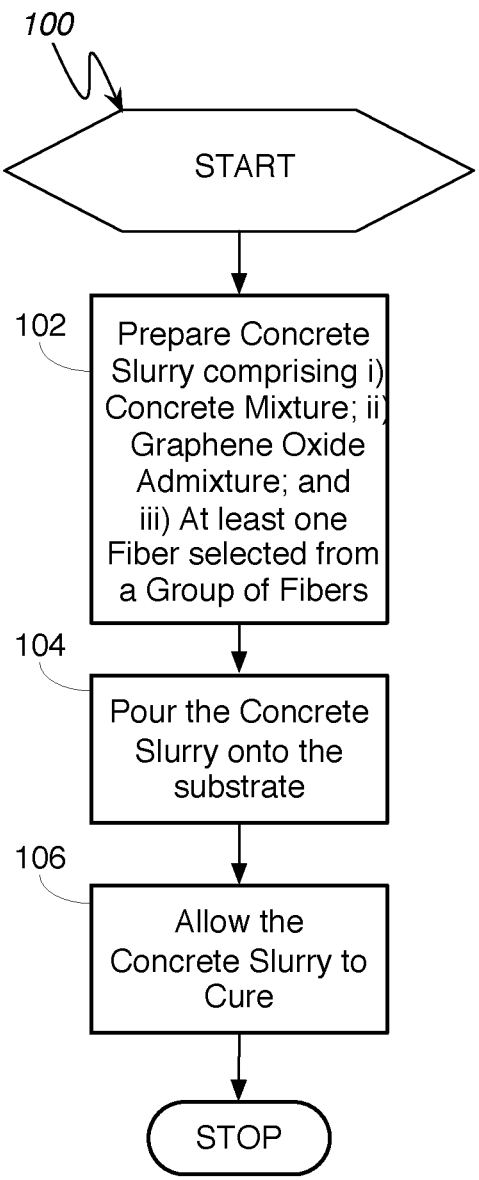
FIG. 3 is a flow diagram showing the steps of a first illustrative embodiment of a method for placing a concrete product.

FIG. 3 is a flow diagram of a first illustrative method 100 according to an exemplary embodiment. The method 100 discloses steps, not all of which are necessarily employed in each and every situation, but which may have similarities to other exemplary embodiments provided herein. The steps in the method 100 may be performed in or out of the order shown. The method 100 comprises the steps of: preparing a concrete slurry comprising i) a concrete mixture; ii) a graphene oxide admixture; and iii) at least one fiber selected from a group consisting of fibers selected from steel fibers and synthetic fibers (102); pouring the concrete slurry onto the substrate (104) and allowing the concrete structure to be embedded with nanometer-sized graphene oxide monolayers or overlapping graphene oxide layers as the concrete cures (106).

In some exemplary embodiments, the preparing step 102 of method 100 comprises preparing the concrete slurry with graphene oxide that is in an aqueous solution and that comprises graphene oxide flakes having a size ranging from between about 1.10±0.20 nm of thickness with size of about 0.5 nm. In another embodiment, the preparing step 102 additionally comprises adding the graphene oxide flakes, via a composite admixture with other additives, or an independent graphene oxide admixture, to the concrete slurry in ranges of between about 0.01% to about 0.10% by weight of cement, wherein % by weight in this instance refers to the aggregate weight of the graphene oxide flakes in comparison to the final weight of cement in the final concrete product. In another embodiment, the preparing step 102 additionally comprises preparing the concrete slurry for pouring with dosages of steel fibers as the at least one fiber selected from a group of fibers of between about 33.0 lbs./cuyd to about 66.0 lbs./cuyd. In another embodiment, the preparing step 102 additionally comprises preparing the concrete admixture for pouring with dosages of macro synthetic fibers as the at least one fiber selected from a group of fibers of between about 3.0 lbs./cuyd to about 7.5 lbs./cuyd.

Figure 4:
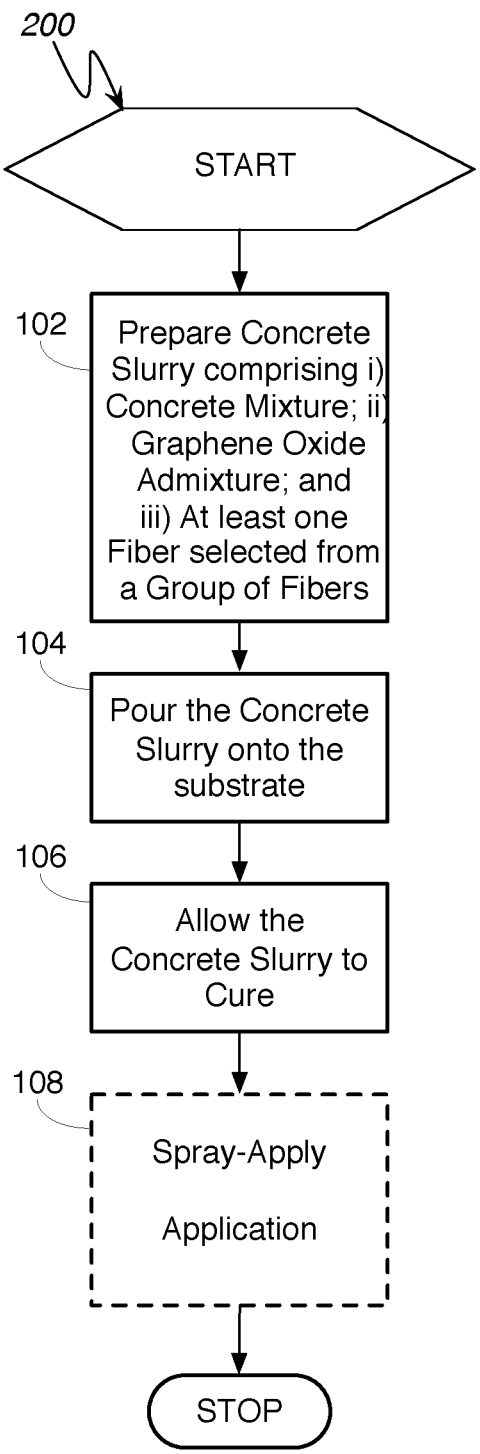
FIG. 4 is a flow diagram showing the steps of a second illustrative embodiment of a method for placing a concrete product.

FIG. 4 is a flow diagram of a second illustrative method 200 according to an exemplary embodiment. Some of the steps of the method 200 are identical to the steps in the method 100 of FIG. 3; therefore, only the differences in the method 200 are detailed herein. The method 200 additionally comprises the step 108 of spray-applying a secondary graphene oxide application onto the poured concrete slurry to facilitate curing thereof. The spray-applying step 108 comprises spray applying the secondary graphene oxide application onto the poured concrete slurry while the concrete slurry is wet and/or subsequent to removal of a trowel machine and prior to cement in the poured concrete slurry being completely set.

The spray-applying step 108 may comprise, in other embodiments, spray-applying the poured concrete slurry with a graphene oxide in an aqueous solution having sheared particles with size of about 5.0 nm, wherein the mixture used for the spray-applying has between about 10.0 grams to 1,000.0 grams of graphene oxide per gallon of carrier, and wherein the coverage rate is about 250 gallons of graphene oxide solution per square foot, or from about 100.0 to about 500.0 gallons per square foot. The spray-applying step 108 also may comprise spray-applying the secondary graphene oxide application onto the poured concrete slurry subsequent to cement in the poured concrete slurry being completely set, and spray-applying to the point of saturation or "flooding state" as is known in the art.

Figure 5:
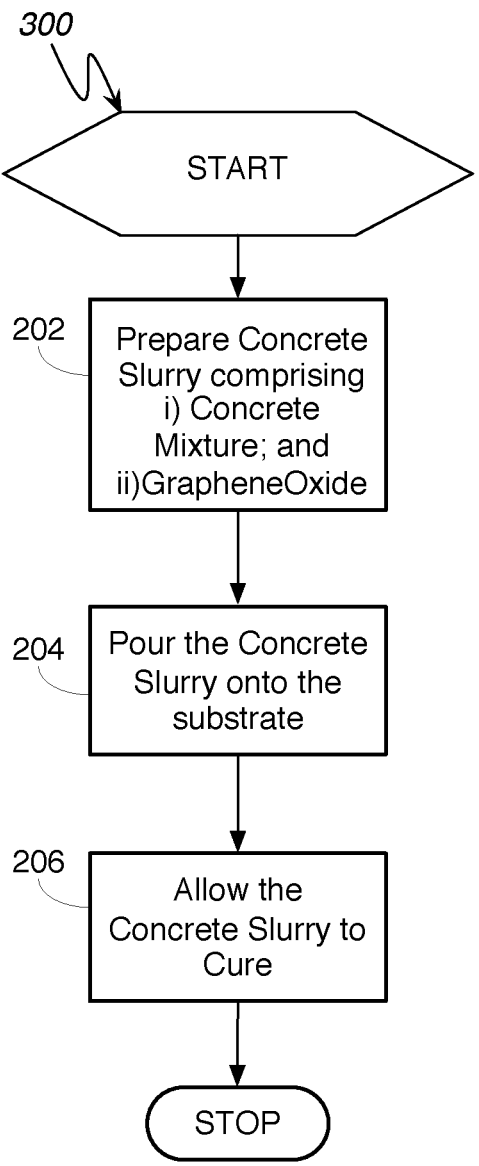
FIG. 5 is a flow diagram showing the steps of a third illustrative embodiment of a method for placing a concrete product.

FIG. 5 is a flow diagram of a third illustrative method 300 according to an exemplary embodiment. In an exemplary embodiment the method 300 comprises the steps of: preparing a concrete slurry comprising i) a concrete mixture and ii) a graphene oxide admixture (202); pouring the concrete slurry onto the substrate (204); and allowing the concrete slurry to cure (206), such that the concrete structure defining the capillary structures is embedded with nanometer-sized monolayers or overlapping layers of graphene oxide.

In some exemplary embodiments, similar to those described for FIG. 3 and FIG. 4, the preparing step 202 of method 300 comprises: (1) preparing a graphene oxide admixture comprising the steps of (i) adding graphite oxide powder to a solvent or liquid carrier, and (ii) either mechanically shearing the combination with a high-shear mixing device, such that the sheared graphene oxide flakes are dispersed into the solvent or liquid carrier, and/or mechanically shearing the graphite oxide via probe sonication with an ultrasonic cavitation device, such that sheared graphene oxide flakes are dispersed into solution; and (2) preparing the concrete slurry with the graphene oxide admixture as prepared, which comprises graphene oxide flakes having a size ranging from between about 1.10+/−0.20 nm of thickness with particle size of about 0.5 nm. In another embodiment, the preparing step 202 additionally comprises adding the graphene oxide flakes to the concrete slurry in ranges of between about 0.01% to about 0.10% by weight of cement.

In some exemplary embodiments, the preparing step 202 of method 300 comprises preparing a graphene oxide admixture comprising the steps of (i) adding graphite oxide powder to a solvent or liquid carrier, (ii) adding a polycarboxylate additive, and (iii) either mechanically shearing the combination with a high-shear mixing device, and/or mechanically shearing the combination via probe sonication with an ultrasonic cavitation device.

Figure 6:
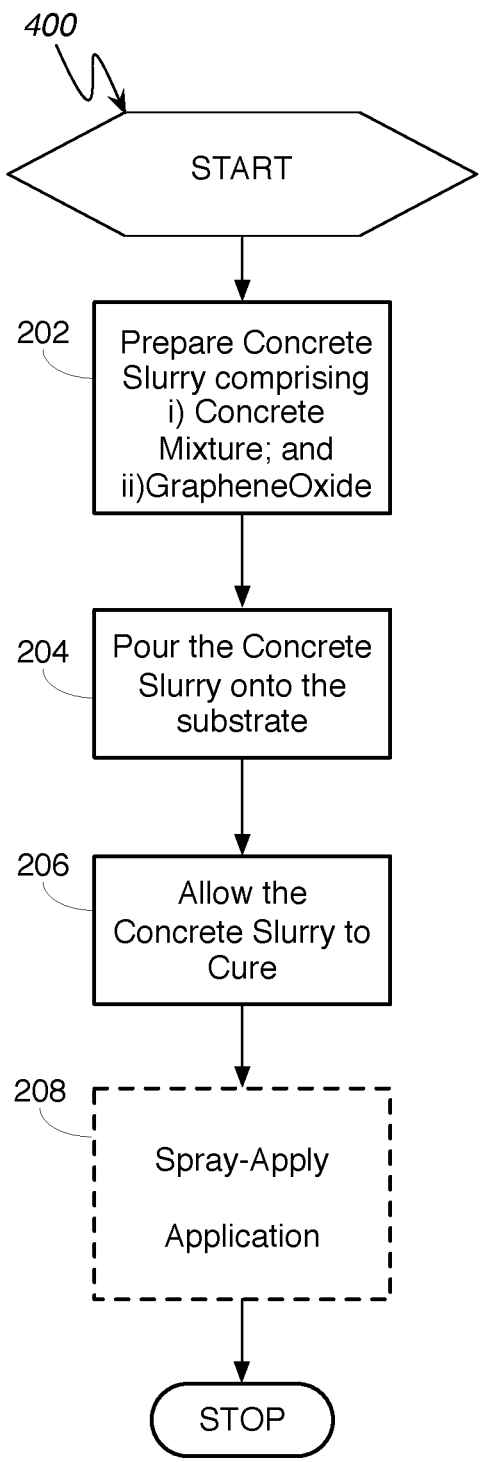
FIG. 6 is a flow diagram showing the steps of a fourth illustrative embodiment of a method for placing a concrete product.

FIG. 6 is a flow diagram of a fourth illustrative method 400 according to an exemplary embodiment. Some of the steps of the method 400 are identical to steps in the method 300 of FIG. 5; therefore, only the differences in the method 400 are detailed herein. The method 400 additionally comprises the step 208 of spray-applying a secondary graphene oxide application onto the poured concrete slurry to facilitate curing thereof. The spray-applying step 208 comprises spray applying the secondary graphene oxide onto the poured concrete slurry subsequent to removal of a trowel machine and prior to cement in the poured concrete slurry being completely set. The spray-applying step 208 comprises spray applying the poured concrete slurry with graphene oxide flakes in an aqueous solution having sheared particles with size of about 5.0 nm, wherein the aqueous solution has between about 10.0 grams to 1,000.0 grams of graphene oxide per gallon of liquid carrier. The spray-applying step 208 also comprises spray-applying the secondary graphene oxide application onto the poured concrete slurry subsequent to cement in the poured concrete slurry being completely set.

The spray-applying step 208 may comprise, in other embodiments, spray-applying the poured concrete slurry with a graphene oxide in an aqueous solution, without spray-applying colloidal silica, and having sheared particles with size of about 5.0 nm, wherein the graphene oxide solution has a particle weight that ranges from between about 0.01% to about 0.10%, and wherein the coverage rate is about 250 gallons of graphene oxide solution per square foot, or from about 100.0 to about 500.0 gallons per square foot.

Figure 7:
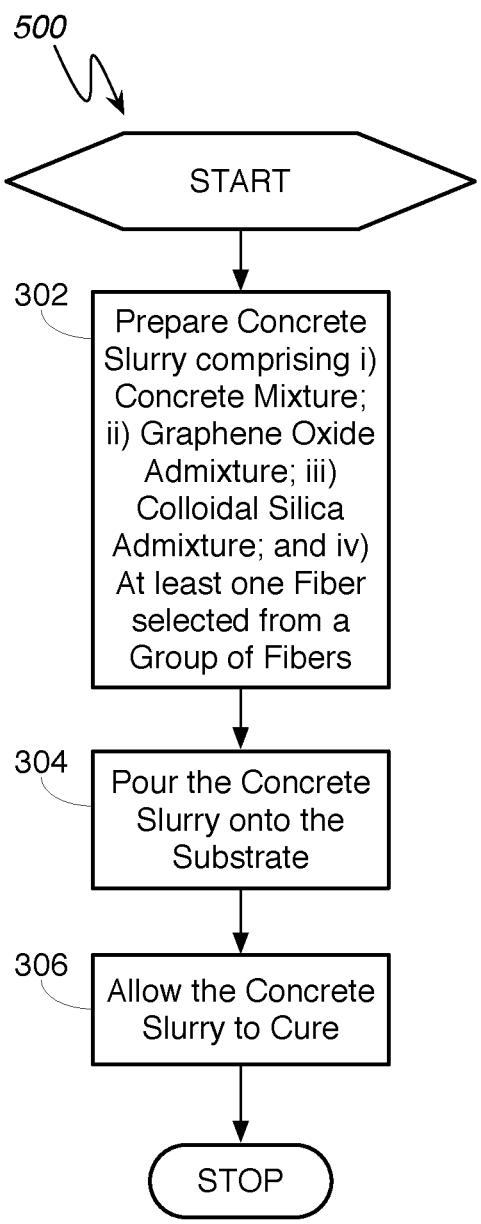
FIG. 7 is a flow diagram showing the steps of a fifth illustrative embodiment of a method for placing a concrete product.

FIG. 7 is a flow diagram of a fifth illustrative method 500 according to an exemplary embodiment. The method 500 discloses steps, not all of which are necessarily employed in each and every situation, but which may have similarities to other exemplary embodiments provided herein. The steps in the method 500 may be performed in or out of the order shown. The method 500 comprises the steps of: (1) preparing a concrete slurry comprising i) a concrete mixture; ii) a graphene oxide admixture; iii) a colloidal silica admixture; and iv) at least one fiber selected from a group consisting of fibers selected from steel fibers and synthetic fibers (302); (2) pouring the concrete slurry onto the substrate (304); and (3) allowing the concrete slurry to cure (306). This method 500 allows the capillary structures to develop as the concrete slab sets from the poured concrete slurry, allows the capillary structures of the slab to at least in part fill with silica and lime, allows the silica and lime to react to produce a gel structure of calcium silicate hydrate that at least partially fill, respectively, the capillary structures, and allows the concrete structure defining the capillary structures to be embedded with nanometer-sized graphene oxide monolayers or overlapping graphene oxide layers.

In some exemplary embodiments, the preparing step 302 of method 500 comprises: (1) preparing a graphene oxide and colloidal silica composite admixture comprising the steps of (i) adding graphite oxide powder to a prepared colloidal silica admixture, and (ii) mechanically shearing the combination with a high-shear mixing device such that the sheared graphene oxide flakes are dispersed into the colloidal silica admixture; and (2) preparing the concrete slurry with the colloidal silica and graphene oxide composite admixture, which comprises silica having a size ranging from between about 10.0 nm to about 100.0 nm, or from between about 5.0 nm to about 100.0 nm, or from between about 3.0 nm to about 100.0 nm, and graphene oxide flakes having a size ranging from between about 1.10±0.20 nm of thickness with particle size of about 0.5 nm.

In another exemplary embodiment, the preparing step 302 comprises providing a prepared colloidal silica admixture, and preparing a graphene oxide admixture that is independent from the prepared colloidal silica admixture. The admixtures then may be independently, but not necessarily separately, used to prepare the concrete slurry. In another exemplary embodiment, the preparing step 302 comprises preparing the graphene oxide and colloidal silica admixture(s) comprising the steps of adding graphite oxide powder to an aqueous solution and mechanically shearing the graphite oxide via probe sonication with an ultrasonic cavitation device such that sheared graphene oxide flakes are dispersed into solution.

In another embodiment, the preparing step 302 additionally comprises adding the colloidal silica admixture to the concrete slurry in ranges of between about 0.50% to about 10.0% by weight of cement in the concrete mixture, wherein % by weight refers to the aggregate weight of the silica in comparison to the final weight of cement in the final concrete product. In another exemplary embodiment, the preparing step 302 comprises adding the graphene oxide flakes, via a composite admixture or an independent graphene oxide admixture, to the concrete slurry in ranges of between about 0.01% to about 0.10% by weight of cement, wherein % by weight in this instance refers to the aggregate weight of the graphene oxide flakes in comparison to the final weight of cement in the final concrete product. In another embodiment, the preparing step 302 additionally comprises preparing the concrete slurry for pouring with dosages of steel fibers as the at least one fiber selected from a group of fibers of between about 33.0 lbs./cuyd to about 66.0 lbs./cuyd. In another embodiment, the preparing step 302 additionally comprises preparing the concrete admixture for pouring with dosages of macro synthetic fibers as the at least one fiber selected from a group of fibers of between about 3.0 lbs./cuyd to about 7.5 lbs./cuyd.

Figure 8:
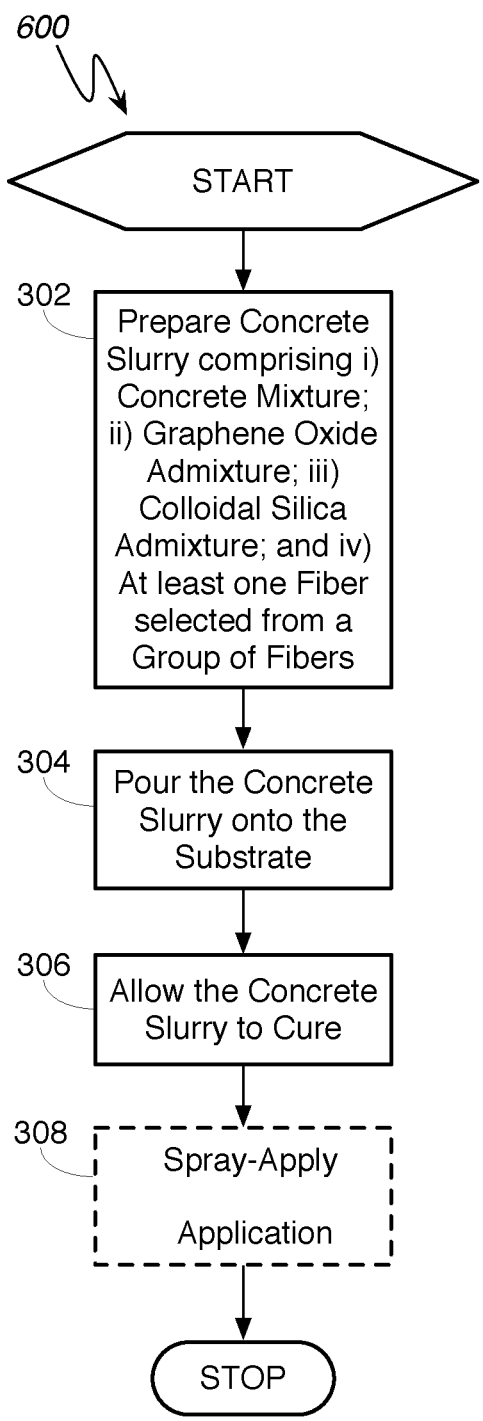
FIG. 8 is a flow diagram showing the steps of a sixth illustrative embodiment of a method for placing a concrete product.

FIG. 8 is a flow diagram of a sixth illustrative method 600 according to an exemplary embodiment. Some of the steps of the method 600 are identical to the steps in the method 500 of FIG. 7; therefore, only the differences in the method 600 are detailed herein. The method 600 additionally comprises the step 308 of spray-applying a secondary colloidal silica onto the poured concrete slurry to facilitate curing thereof. The spray-applying step 308 comprises spray applying the secondary colloidal silica onto the poured concrete slurry subsequent to removal of a trowel machine and prior to cement in the poured concrete slurry being completely set. The spray-applying step 308 may comprise in other embodiments spray-applying the poured concrete slurry with an amorphous secondary colloidal silica in an aqueous solution having silica with size ranging from about 10.0 nm to about 50.0 nm, or from about 3.0 nm to about 50.0 nm, or from about 3.0 nm to about 25.0 nm, or from about 3.0 nm to about 100.0 nm wherein the colloidal solution used for the spray-applying has between about 10.0 grams to 1,000.0 grams of colloidal silica per gallon of colloid, and wherein the coverage rate is about 250 gallons of colloidal solution per square foot, or from about 100.0 to about 500.0 gallons per square foot. The spray-applying step 308 also may comprise spray-applying the secondary colloidal silica onto the poured concrete slurry subsequent to cement in the poured concrete slurry being completely set, and spray-applying to the point of saturation or "flooding state" as is known in the art.

In some exemplary embodiments, the step 308 of method 600 comprises spray-applying a graphene oxide and colloidal silica composite admixture similar to the composite admixture defined herein for certain embodiments of step 302. In another exemplary embodiment, the step 308 of method 600 comprises spray-applying a prepared colloidal silica admixture and a graphene oxide admixture prepared at the point-of-use and that is independent from the prepared colloidal silica admixture, those admixtures as defined herein for certain embodiments of step 302.

The spray-applying step 308 may comprise, in other embodiments, spray-applying the poured concrete slurry with a graphene oxide in an aqueous solution, without spray-applying colloidal silica, and having sheared particles with size of about 5.0 nm, wherein the colloidal solution used for the spray-applying has between about 10.0 grams to 1,000.0 grams of graphene oxide per gallon of colloid, and wherein the coverage rate is about 250 gallons of graphene oxide solution per square foot, or from about 100.0 to about 500.0 gallons per square foot.

Figure 9:
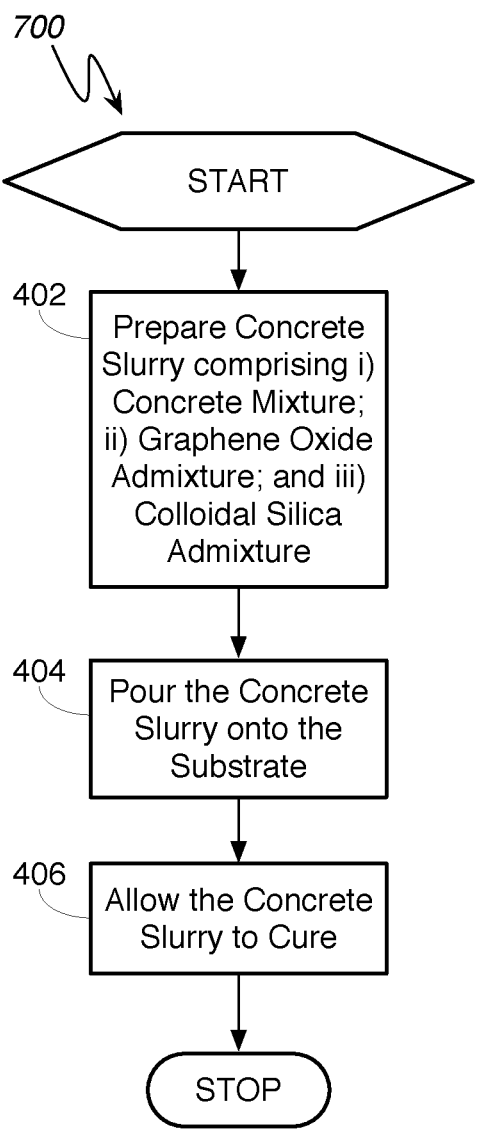
FIG. 9 is a flow diagram showing the steps of a seventh illustrative embodiment of a method for placing a concrete product.

FIG. 9 is a flow diagram of a seventh illustrative method 700 according to an exemplary embodiment. In an exemplary embodiment the method 700 comprises the steps of: preparing a concrete slurry comprising i) a concrete mixture; ii) a graphene oxide admixture; and iii) a colloidal silica admixture (402); pouring the concrete slurry onto the substrate (404); and allowing the concrete slurry to cure (406).

In some exemplary embodiments, similar to those described for FIG. 7 and FIG. 8, the preparing step 402 of method 700 comprises: (1) preparing a graphene oxide and colloidal silica composite admixture comprising the steps of (i) adding graphite oxide powder to a prepared colloidal silica admixture, and (ii) either mechanically shearing the combination with a high-shear mixing device, such that the sheared graphene oxide flakes are dispersed into the colloidal silica admixture, and/or mechanically shearing the graphite oxide via probe sonication with an ultrasonic cavitation device, such that sheared graphene oxide flakes are dispersed into solution; and (2) preparing the concrete slurry with the colloidal silica and graphene oxide composite admixture, which comprises silica having a size ranging from between about 10.0 nm to about 100.0 nm, or from between about 5.0 nm to about 100.0 nm, or from between about 3.0 nm to about 100.0 nm, and graphene oxide flakes having a size ranging from between about 1.10+/−0.20 nm of thickness with size of about 0.5 nm. In another exemplary embodiment, the preparing step 402 comprises providing a prepared colloidal silica admixture, and preparing a graphene oxide admixture that is independent from the prepared colloidal silica admixture. The admixtures may then be independently, but not necessarily separately, used to prepare the concrete slurry.

In another embodiment, the preparing step 402 additionally comprises adding the colloidal silica admixture to the concrete slurry in ranges of between about 0.50% to about 10.0% by weight of cement in the concrete mixture. In another exemplary embodiment, the preparing step 402 comprises adding the graphene oxide flakes, via a composite admixture or an independent graphene oxide admixture, to the concrete slurry in ranges of between about 0.01% to about 0.10% by weight of cement.

Figure 10:
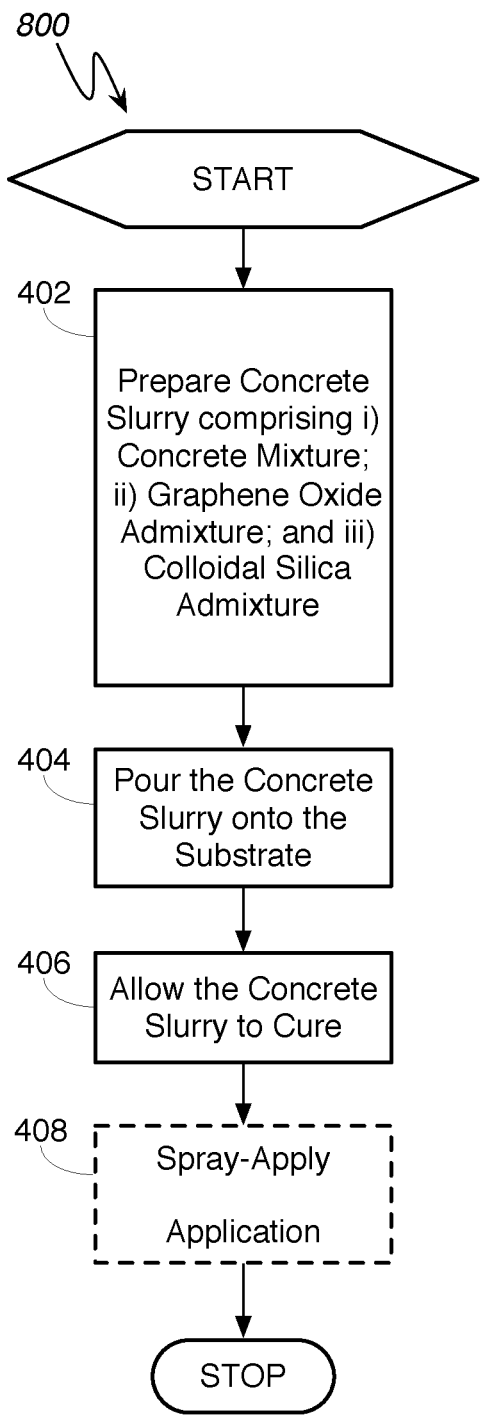
FIG. 10 is a flow diagram showing the steps of an eighth illustrative embodiment of a method for placing a concrete product.

FIG. 10 is a flow diagram of an eighth illustrative method 800 according to an exemplary embodiment. Some of the steps of the method 800 are identical to steps in the method 700 of FIG. 9; therefore, only the differences in the method 800 are detailed herein. The method 800 additionally comprises the step 408 of spray-applying a secondary colloidal silica onto the poured concrete slurry to facilitate curing thereof. The spray-applying step 408 comprises spray applying the secondary colloidal silica onto the poured concrete slurry subsequent to removal of a trowel machine and prior to cement in the poured concrete slurry being completely set. The spray-applying step 408 comprises spray-applying the poured concrete slurry with an amorphous secondary colloidal silica in an aqueous solution having silica with size ranging from about 10.0 nm to about 50.0 nm, or from about 3.0 nm to about 50.0 nm. The spray-applying step 408 comprises spray-applying the secondary colloidal silica onto the poured concrete slurry subsequent to cement in the poured concrete slurry being completely set.

In some exemplary embodiments, the step 408 of method 800 comprises spray-applying a graphene oxide and colloidal silica composite admixture similar to the composite admixture defined herein for certain embodiments of step 402. In another exemplary embodiment, the step 408 of method 800 comprises spray-applying a prepared colloidal silica admixture and a graphene oxide admixture prepared at the point-of-use and that is independent from the prepared colloidal silica admixture, those admixtures as defined herein for certain embodiments of step 402.

The spray-applying step 408 may comprise, in other embodiments, spray-applying the poured concrete slurry with a graphene oxide in an aqueous solution, without spray-applying colloidal silica, and having sheared particles with size of about 5.0 nm, wherein the aqueous solution has between about 10.0 grams to 1,000.0 grams of graphene oxide per gallon of solution, and wherein the coverage rate is about 250 gallons of graphene oxide solution per square foot, or from about 100.0 to about 500.0 gallons per square foot.

Figure 11:
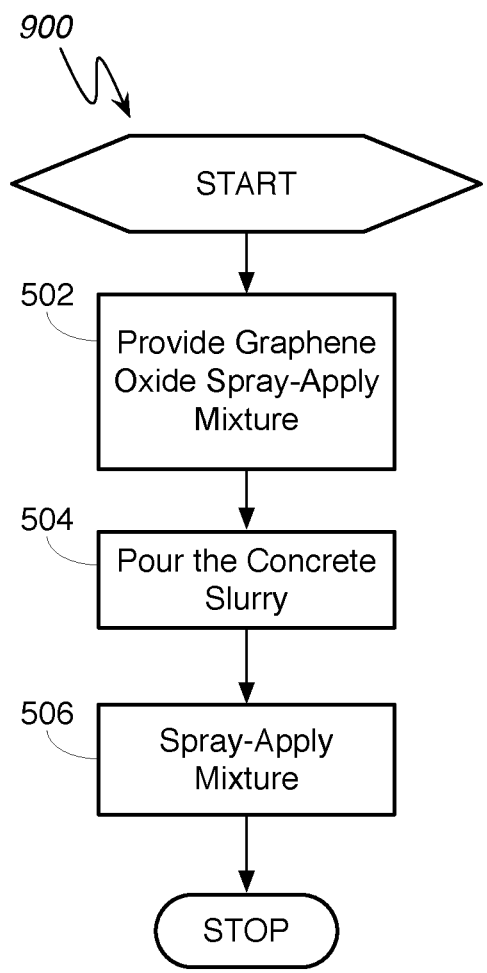
FIG. 11 is a flow diagram showing the steps of a ninth illustrative embodiment of a method for placing a concrete product.

FIG. 11 is a flow diagram of a ninth illustrative method 900 according to an exemplary embodiment. The method 900 discloses steps, not all of which are necessarily employed in each and every situation, but which may have similarities to other exemplary embodiments provided herein. The steps in the method 900 may be performed in or out of the order shown. The method 900 comprises the steps of: providing a graphene oxide spray-apply mixture (502); pouring a concrete slurry onto a substrate or for a concrete product (504); and spray-applying the graphene oxide spray-apply mixture onto the poured concrete slurry to facilitate curing thereof (506). This allows the concrete structure to be embedded with nanometer-sized graphene oxide monolayers or overlapping graphene oxide layers as the concrete cures.

In some exemplary embodiments, the providing step 502 of method 900 comprises preparing a graphene oxide spray-apply mixture similar to the graphene oxide admixture defined herein for certain embodiments of step 102 for method 100, for example. In another exemplary embodiment, the step 502 of method 900 comprises spray applying a graphene oxide spray-apply mixture prepared at the point-of-use and that is independent from any prepared colloidal silica admixture or mixture that may or may not be used.

In some exemplary embodiments, the spray-applying step 506 comprises spray-applying the graphene oxide spray-apply mixture onto the poured concrete slurry while the cement is in a wet state, immediately after pouring or some time thereafter. The spray-applying step 508 also may comprise spray-applying the graphene oxide spray-apply mixture subsequent to removal of a trowel machine and prior to cement in the poured concrete slurry being completely set. The spray-applying step 508 also may comprise spray-applying the graphene oxide spray-apply mixture onto the poured concrete slurry subsequent to cement in the poured concrete slurry being completely set, and spray-applying to the point of saturation or "flooding state" as is known in the art.

Figure 12:
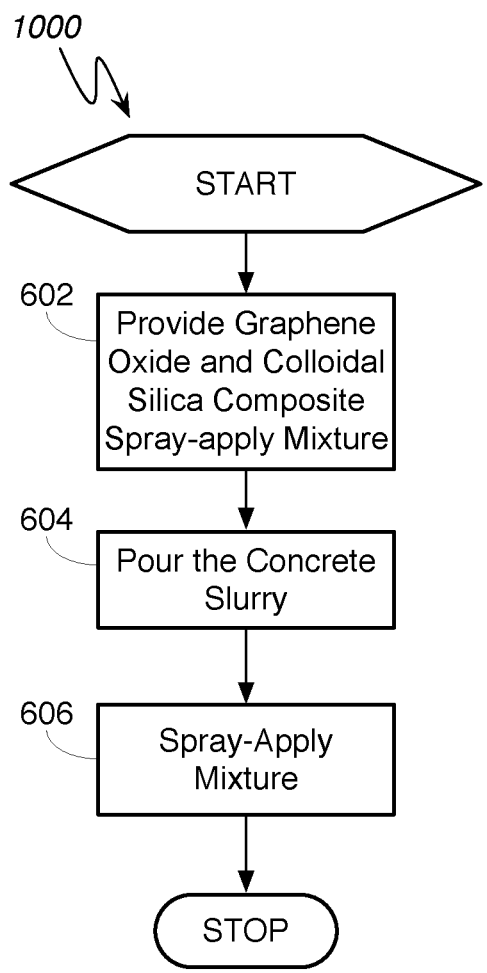
FIG. 12 is a flow diagram showing the steps of a tenth illustrative embodiment of a method for placing a concrete product.

FIG. 12 is a flow diagram of a tenth illustrative method 1000 according to an exemplary embodiment. The method 1000 discloses steps, not all of which are necessarily employed in each and every situation, but which may have similarities to other exemplary embodiments provided herein. The steps in the method 1000 may be performed in or out of the order shown. The method 1000 comprises the steps of: providing a graphene oxide and colloidal silica composite spray-apply mixture (602); pouring a concrete slurry onto a substrate or for a concrete product (604); and spray-applying the graphene oxide and colloidal silica composite spray-apply mixture onto the poured concrete slurry to facilitate curing thereof (606). This allows the concrete structure to be embedded with nanometer-sized graphene oxide monolayers or overlapping graphene oxide layers, and colloidal silica and lime reactant product, as the concrete cures.

In some exemplary embodiments, the providing step 602 of method 1000 comprises preparing a graphene oxide and colloidal silica composite spray-apply mixture similar to the graphene oxide admixture and colloidal silica admixture defined herein for certain embodiments of step 102 of method 100 and step 302 of method 500, for example, or wherein the composite mixture has between about 10.0 grams to 1,000.0 grams of graphene oxide or colloidal silica per gallon of mixture. In another exemplary embodiment, the step 602 of method 1000 comprises spray-applying a graphene oxide and colloidal silica composite spray-apply mixture prepared at the point-of-use and that is independent from any prepared colloidal silica admixture or mixture or graphene oxide admixture or mixture that may or may not be used.

In some exemplary embodiments, the spray-applying step 606 comprises spray-applying the composite spray-apply mixture onto the poured concrete slurry while the cement is in a wet state, immediately after pouring or some time thereafter. The spray-applying step 508 also may comprise spray-applying the composite spray-apply mixture onto the poured concrete slurry subsequent to removal of a trowel machine and prior to cement in the poured concrete slurry being completely set. The spray-applying step 608 also may comprise spray-applying the graphene oxide and colloidal silica composite spray-apply mixture onto the poured concrete slurry subsequent to cement in the poured concrete slurry being completely set, and spray-applying to the point of saturation or "flooding state" as is known in the art.

Figure 13:
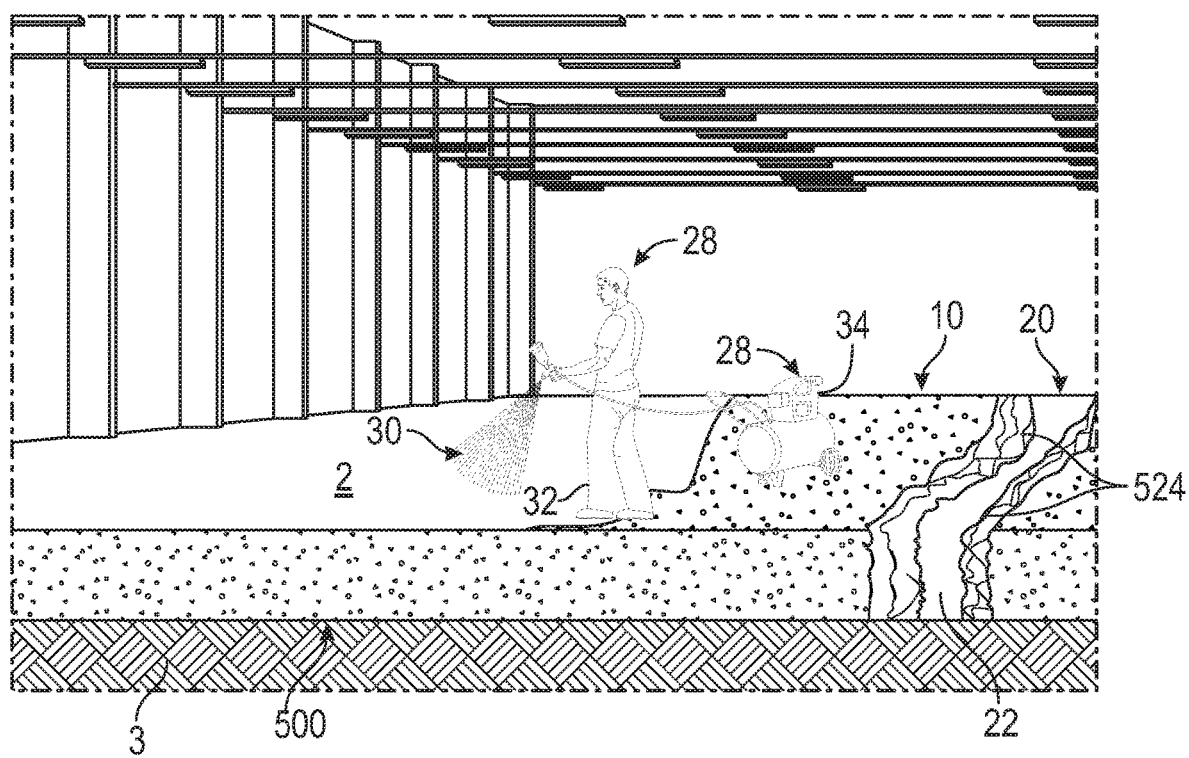
FIG. 13 is a perspective view of an exemplary fiberless concrete product.

FIG. 13 shows a perspective view of an exemplary fiberless concrete slab 500. The fiberless concrete slab 500 is similar to the concrete slab 1 of FIG. 1; therefore, only the differences in the fiberless concrete slab 500 are detailed herein.

The fiberless concrete slab 500 is illustrated in partial cut-away form to show layers of internal composition and structure of the composite material. The second cut-away section 20 illustrates the fiberless concrete slab 500 having a crack 22 to expose the internal composition of the composite material of the fiberless concrete slab 500. In particular, the fiberless concrete slab 500 comprises hardened aggregate and cement 524 without steel fibers and/or macro synthetic fibers. The hardened aggregate and cement 524 at least in part define capillary structures 26 (FIG. 2) throughout the fiberless concrete slab 500, and the capillary structures 26 (FIG. 2) are filled with reactive nanometer-sized silica that react with free lime to produce a stable gel structure of calcium silicate hydrate within the capillary structures 26 (FIG. 2). The hardened aggregate and cement 524 defining the capillary structures is embedded with nanometer-sized graphene oxide flakes or overlapping layers of flakes. An optional spray-apply system 28 may be used for spray-applying a secondary colloidal silica and dispersed graphene oxide flake composite 30 on the entire surface of the fiberless concrete slab 500 to saturation such that the nanometer-sized colloidal silica in the secondary spray 30 can penetrate and complete the fill of the capillary structures 26, and such that the graphene oxide flakes can be dispersed and embedded throughout the hardened aggregate and cement 524.

In one or more exemplary embodiments described herein, the systems and methods described may be implemented in various ways using various methodologies. Although selected aspects have been illustrated and described in detail, it will be understood that various substitutions and alterations may be made therein without departing from the spirit and scope of the present invention, as defined by the following claims.

What is claimed is:

1. A concrete product set by pouring a concrete slurry, the poured concrete slurry comprising:
 a) a concrete mixture;
 b) a graphene oxide flake admixture; and
 c) at least one fiber selected from the group of fibers consisting of steel fibers, helix fibers, basalt fibers, polyvinyl alcohol (PVA) fibers, carbon fibers, and synthetic fibers;
 wherein, as the poured concrete slurry cures, the poured slurry hardens into a composite material, the composite material defining capillary structures that at least in part fill with graphene oxide flakes;
 wherein the graphene oxide flakes embed along and partially fill the capillary structures, the partially-filled capillary structures reduce internal tensile forces as well as shrinking and cracking of the concrete product; the embedded graphene oxide flakes at least in part distribute the load of the composite material acting on the concrete product; and
 wherein the concrete product is set by pouring the concrete slurry and then applying a curing technique to the poured concrete slurry, and wherein the curing technique comprises spray-applying a secondary graphene oxide onto the poured concrete slurry.

2. The concrete product of claim 1 wherein the graphene oxide also is spray-applied onto the poured concrete slurry subsequent to removing a trowel machine.

3. The concrete product of claim 1 wherein the graphene oxide flakes of the secondary graphene oxide application are about 1.10±0.20 nm thick with lattice constant of about 0.27 nm×0.41 nm.

4. The concrete product of claim 1 wherein the graphene oxide is spray-applied onto the poured concrete slurry subsequent to cement in the poured concrete slurry being set.

5. The concrete product of claim 1 wherein the concrete mixture comprises aggregate, cement, and water, and wherein the concrete mixture is defined by a water to cement ratio of between about 0.400 to about 0.450.

6. The concrete product of claim 1 wherein the at least one fiber selected from the group consisting of steel fibers, helix fibers, basalt fibers, PVA fibers, carbon fibers, and synthetic fibers represents between about 0.20% by volume to about 0.50% by volume of the poured concrete slurry.

7. A process for preparing a concrete product, the process comprising:
 a) preparing a concrete slurry, the concrete slurry comprising:
  i) a concrete mixture;
  ii) a graphene oxide flake admixture; and
  iii) at least one fiber selected from the group of fibers consisting of steel fibers, helix fibers, basalt fibers, PVA fibers, carbon fibers, and synthetic fibers;
 b) pouring the concrete slurry;
 c) allowing the concrete slurry to cure such that capillary structures develop as the concrete product sets from the poured concrete slurry, and such that the capillary structures of the product at least in part fill with graphene oxide flakes, and such that the graphene oxide flakes embed along and partially fill the capillary structures, the partially-filled capillary structures reduce internal tensile forces as well as shrinking and cracking of the concrete product; and
 d) spray-applying a secondary graphene oxide onto the poured concrete slurry to facilitate curing thereof.

8. The process for preparing a concrete product of claim 7 wherein the preparing step comprises preparing the concrete slurry with graphene oxide flakes having a size of about 1.10±0.20 nm thick with lattice constant of about 0.27 nm×0.41 nm.

9. The process for preparing a concrete product of claim 8 wherein the preparing step additionally comprises adding the graphene oxide admixture to the concrete slurry in ranges of between about 0.01% to about 0.10% by weight of cement.

10. The process for preparing a concrete product of claim 7 wherein the spray-applying step comprises spray-applying the secondary graphene oxide onto the poured concrete slurry subsequent to removal of a trowel machine and prior to cement in the poured concrete slurry being completely set.

11. The process for preparing a concrete product of claim 7 wherein the spray-applying step comprises spray-applying the poured concrete slurry with a secondary graphene oxide application having graphene oxide flakes with size of about 1.10±0.20 nm thick with lattice constant of about 0.27 nm×0.41 nm.

12. The process for preparing a concrete product of claim 7 wherein the spray-applying step comprises spray-applying the secondary graphene oxide onto the poured concrete slurry subsequent to cement in the poured concrete slurry being set.

13. The process for preparing a concrete product of claim 7 wherein the preparing step comprises preparing the concrete slurry for pouring with dosages of steel fibers as the at least one fiber selected from the group of fibers of between about 33.0 pounds per cubic yard (lbs./cuyd) to about 66.0 lbs./cuyd.

14. The process for preparing a concrete product of claim 7 wherein the preparing step comprises preparing the concrete slurry for pouring with dosages of helix fibers, basalt fibers, PVA fibers, or carbon fibers, as the at least one fiber selected from the group of fibers, of between about 3.0 lbs./cuyd to about 7.5 lbs./cuyd, or about 3.0 lbs./cuyd to about 35.0 lbs./cuyd of helix fibers.

15. A concrete product set from a poured concrete slurry, the poured concrete slurry comprising a concrete mixture, graphene oxide flake admixture, and at least one fiber selected from the group of fibers consisting of steel fibers, helix fibers, basalt fibers, PVA fibers, carbon fibers, and synthetic fibers, the concrete product comprising capillary structures that are at least in part embedded with and filled with graphene oxide flakes, the filled capillary structures reduce internal tensile forces as well as shrinking and cracking of the concrete product, the embedded graphene oxide flakes being graphene oxide monolayers or overlapping graphene oxide layers, whereby the embedded graphene oxide monolayers or overlapping graphene oxide layers at least in part distribute the load acting on the concrete product.

16. The concrete product of claim 15 wherein the graphene oxide flakes are about 1.10±0.20 nm thick with lattice constant of about 0.27 nm×0.41 nm.

17. The concrete product of claim 15 wherein the concrete product is cured by application of a spray-applied secondary graphene oxide.

18. The concrete product of claim 17 wherein the graphene oxide flakes have a size of about 1.10±0.20 nm thick with lattice constant of about 0.27 nm×0.41 nm.

19. The concrete product of claim 15 wherein the concrete mixture comprises aggregate, cement, and water, and wherein the concrete mixture is defined by a water to cement ratio of between about 0.400 to about 0.450.

20. The concrete product of claim 15 wherein the at least one fiber selected from the group consisting of steel fibers, helix fibers, basalt fibers, PVA fibers, carbon fibers, and synthetic fibers represents between about 0.20% by volume to about 0.50% by volume of the poured concrete slurry.

* * * * *